United States Patent
Low et al.

(10) Patent No.: US 7,461,317 B2
(45) Date of Patent: Dec. 2, 2008

(54) SYSTEM AND METHOD FOR ALIGNING A QUADRATURE ENCODER AND ESTABLISHING A DECODER PROCESSING SPEED

(75) Inventors: Moon Leong Low, Penang (MY); Han Hua Leong, Penang (MY); Wee Sern Lim, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 411 days.

(21) Appl. No.: 11/300,922

(22) Filed: Dec. 15, 2005

(65) Prior Publication Data

US 2007/0143658 A1 Jun. 21, 2007

(51) Int. Cl.
*G01R 31/30* (2006.01)

(52) U.S. Cl. .......................... 714/745; 714/25; 714/47; 714/700; 714/703; 714/704; 714/705; 714/707; 714/709; 714/731; 714/744; 714/755; 714/746; 714/798; 375/226; 375/225; 375/235; 370/215; 370/236.2; 370/241.1; 370/242; 370/324; 702/89

(58) Field of Classification Search ....................... None
See application file for complete search history.

(56) References Cited

U.S. PATENT DOCUMENTS

| | | | | |
|---|---|---|---|---|
| 4,918,708 A | * | 4/1990 | Pottinger et al. | 375/228 |
| 6,198,788 B1 | * | 3/2001 | Calamatas | 377/16 |
| 6,205,202 B1 | * | 3/2001 | Yoshida et al. | 379/27.02 |
| 6,574,211 B2 | * | 6/2003 | Padovani et al. | 370/347 |
| 6,904,098 B1 | * | 6/2005 | Isaksen et al. | 375/261 |
| 2004/0021632 A1 | * | 2/2004 | Lou | 345/156 |
| 2004/0025097 A1 | * | 2/2004 | Lou | 714/726 |
| 2005/0228654 A1 | * | 10/2005 | Prieto et al. | 704/220 |

* cited by examiner

*Primary Examiner*—John P Trimmings

(57) ABSTRACT

A system and method are disclosed for determining the minimum required processing speed for a quadrature decoder using measurements of encoder performance, and to assess the safety factor of a particular decoder processing speed. The system and method may also be used to indicate proper adjustment direction by displaying real-time error measurements during encoder alignment. The system measures a logic state width error and calculates alignment parameters, processing speed and a safety factor. The method allows a measured logic state width error to be used to calculate a minimum required processing speed and safety factor.

19 Claims, 3 Drawing Sheets

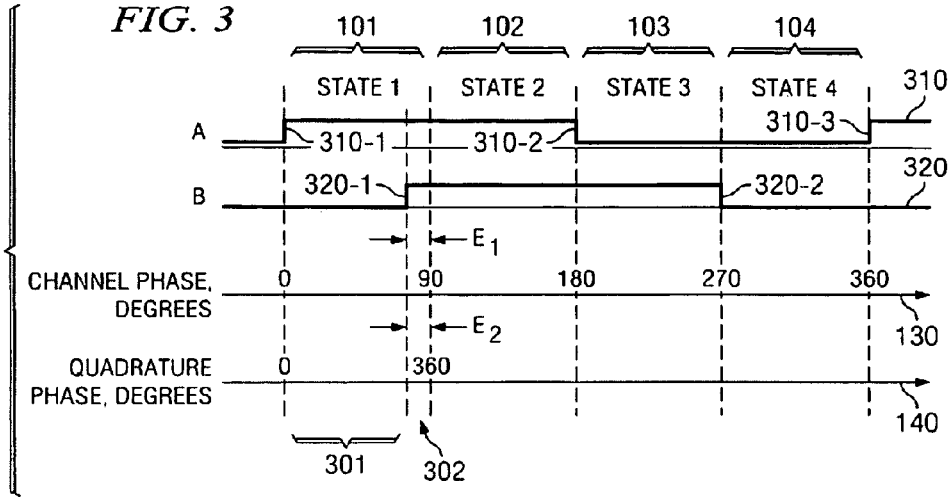
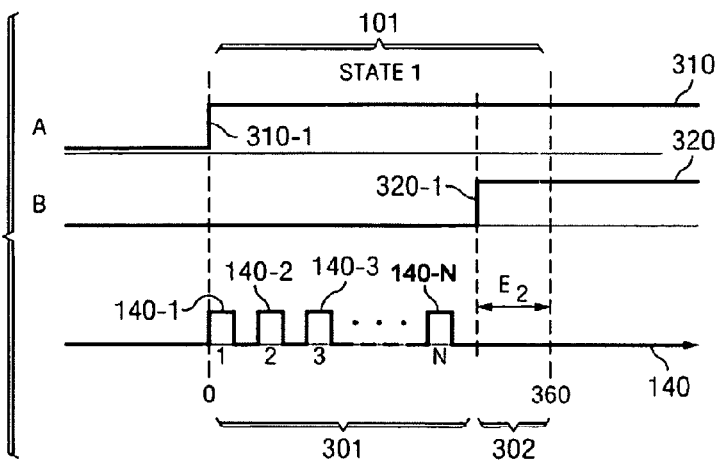
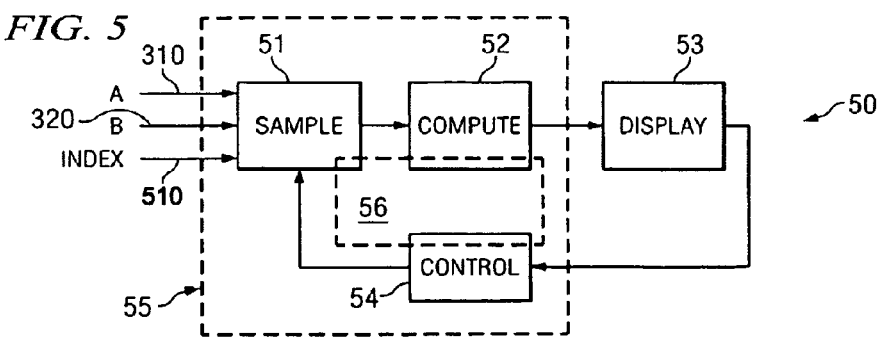

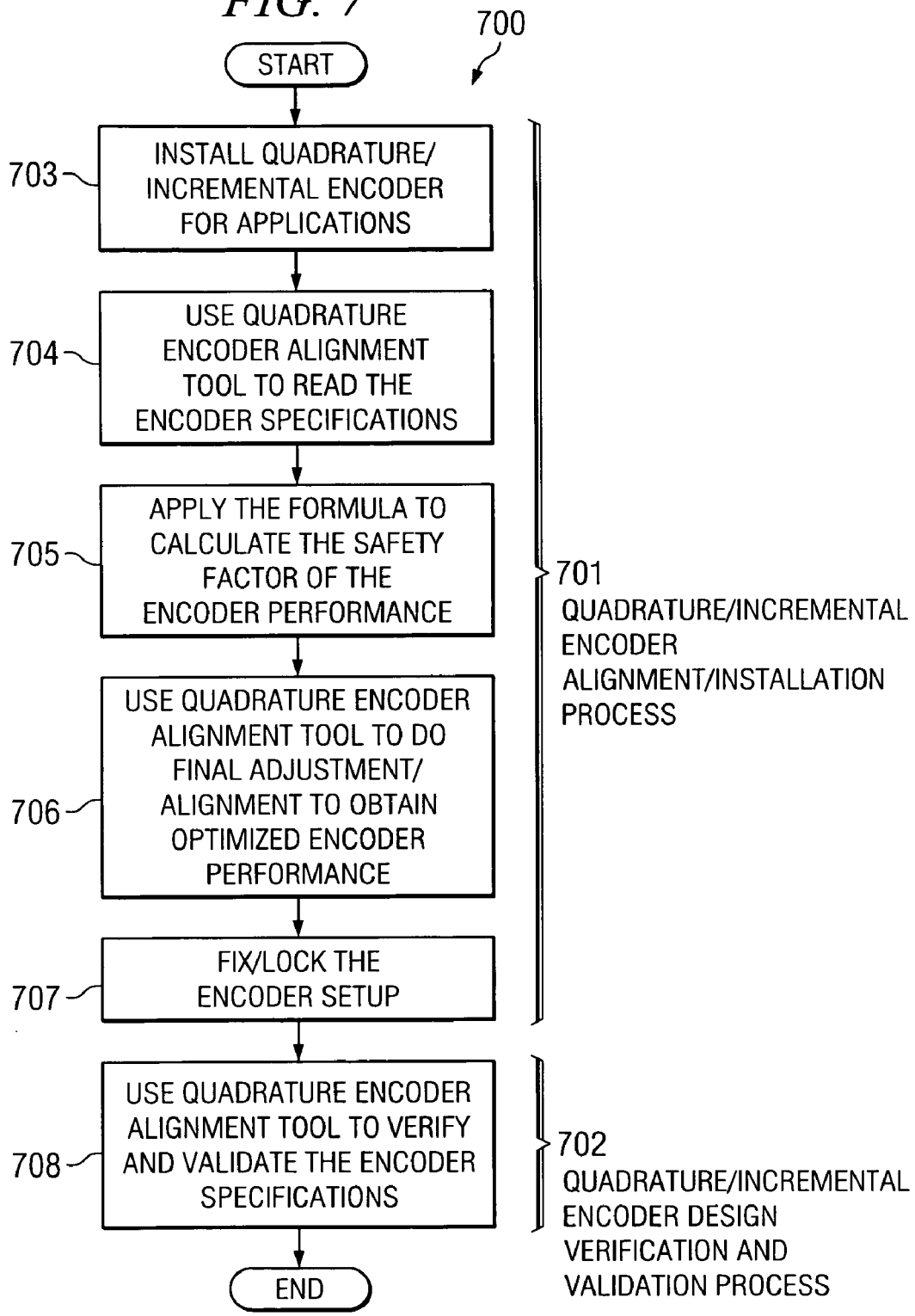

SYSTEM AND METHOD FOR ALIGNING A QUADRATURE ENCODER AND ESTABLISHING A DECODER PROCESSING SPEED

FIELD OF THE INVENTION

This invention generally relates to logic decoding and control, and more particularly to a system and method for aligning a logic decoder and establishing a required processing speed in the presence of logic state width errors.

BACKGROUND OF THE INVENTION

Logic signals convey information by assuming a particular state at a particular time. Errors can be introduced by either incorrect determination of the logic state or by incorrect timing. Determination of a logic state is often done by sampling a signal one or more times during a single state, and processing the samples prior to making a decision about the state. It is important, however, that processing take place during a reliable time window in which the proper state exists. If processing were to occur outside of a reliable time window, errors could occur that might negatively affect the reliability of the logic decision.

One possible source of timing errors that could occur is imperfect channel alignment for signals stored on an encoder. Ideally, each logic state would have the same width and would begin and end at perfectly predictable times. Unfortunately, this is not always the case. As a result, logic decoders that read encoder outputs are typically designed to use a safety factor. The safety factor is intended to ensure an appropriate processing frequency so that an expected worst-case error can be tolerated. If the worst-case expected error is encountered, the decoder will still have performed enough processing during an error-free time window to render a correct determination of the state. Otherwise, if the encoder performs better than the worst case, the processing speed is higher than may be necessary.

Logic encoders may use multiple channels, which provides a source for timing errors, such as a mismatch between the timing of the different channels. In general, a multi-channel system with N channels can assume $2^N$ possible states. A quadrature decoder, for example, has two channels, A and B, and can assume one of four possible states. To determine a state, a quadrature decoder samples both channels of an encoder. If one of the channels changes state at an incorrect time relative to the other channel, a logic state width error arises. Typically, a decoder will require multiple processing cycles for a reliable decision of a single logic state. The ratio of actual processing cycles divided by the theoretical minimum is called a safety factor (SF). The desired number of processing cycles used to decide a single logic state is an engineering choice, based on the reliability, quality and performance of the components used to make a logic state decision.

If the quadrature decoder is decoding signals from a media that is being read, the timing errors depend on the rate at which the media is read and the density of the logic states on the media. With a linear media, the decoder would need to operate at a rate given by the formula:

$$CCF_{min}[MHz] = (V_{encoder}[m/s]/res\,[\mu m])\,SF_{linear} \quad (1)$$

Where:

$CCF_{min}$ is the minimum recommended counter clock frequency in MHz $V_{encoder}$ is the velocity of the linear media in meters per second res is the resolution of the media in micrometers $SF_{linear}$ is a chosen safety factor for the linear encoder.

For rotary encoders, the formula is:

$$CCF_{min}[MHz] = (\omega[rpm]LPR\,IF/(60[sec]1[MHz]))\,SF_{rotary} \quad (2)$$

Where:

$\omega$ is the encoder revolutions per minute

LPR is the disk lines per revolution

IF is the digital interpolation factor $SF_{rotary}$ is a chosen safety factor for the rotary encoder.

A common, fixed SF is typically used for all decoders of the same design. The fixed SF is typically determined by calculating the worst-case error that could result on a hypothetical system operating as the worst combination of design and manufacturing tolerance specifications, calculating the resulting error-free, and then determining the number of processing cycles in the error-free interval. For example, a decoder operating at four times the frequency of a typical quality encoder might have a safety factor of approximately three. Not all decoders, however, operate with identical timing errors, even if sharing many common traits, such as design and manufacturing line. Thus, while the chosen counter clock frequency (CCF) may be appropriate for some decoders, it may be unnecessarily high for others.

BRIEF SUMMARY OF THE INVENTION

A system and method is arranged for determining the minimum required processing speed for a logic decoder using measurements of the encoder performance logic state width error along with a desired safety factor. The system and method may alternatively be used to assess the safety factor of a particular processing speed for a measured encoder performance logic state width error.

In one embodiment, the system and method allows for calculations of logic state width error using inequalities between states, and then allows a minimum processing speed to be set for each individual decoder. A controller monitors rising and falling edges of logic signals and counts the duration of the states. An inequality between states indicates an error. The error is then used to determine an error-free time interval during which the decoder should process the channels for determining the logic state. This interval together with a desired safety factor, are used to determine the processing rate. This then allows the minimum frequency to be used for a specific decoder, rather than using a predetermined frequency that may be unnecessarily high.

In one embodiment alignment information is outputted that permits optimization of the decoder. In another embodiment, once a processing speed has been set, it is compared to the error-free time interval to verify that a proper number of cycles occur during the error-free interval.

BRIEF DESCRIPTION OF THE DRAWINGS

For a more complete understanding of the present invention, reference is now made to the following descriptions taken in conjunction with the accompanying drawings, in which:

FIG. 3 shows non-ideal logic signals for a quadrature encoder with a logic state width error;

FIG. 4 shows the processing cycles of a quadrature encoder with non-ideal logic signals and a logic state width error;

FIG. 5 shows a block diagram of a measurement and reporting system for an embodiment of the invention;

FIG. 7 shows a procedure for using an embodiment of the invention for alignment and verification.

DETAILED DESCRIPTION OF THE INVENTION

Figure 1:
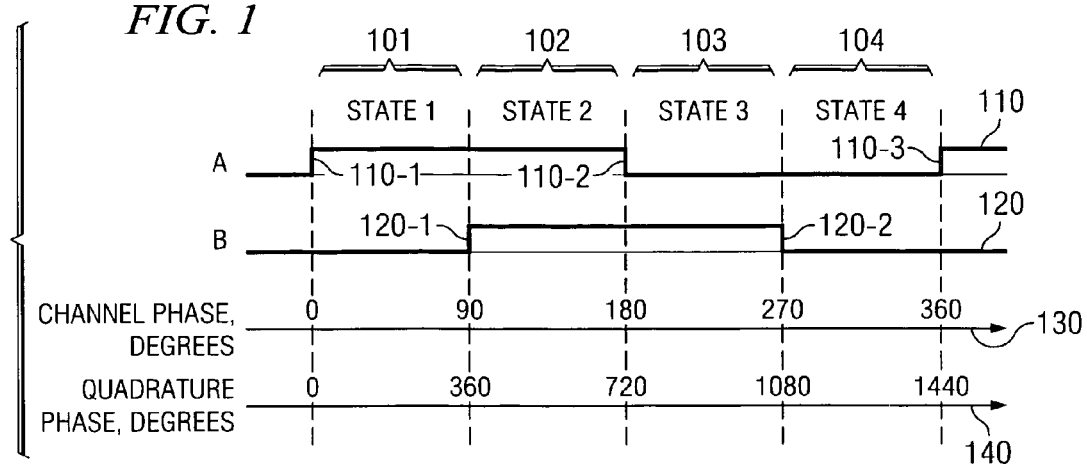
FIG. 1 shows ideal logic signals for a quadrature encoder with no logic state width errors.

FIG. 1 shows ideal logic signals 110 and 120 (channels A and B, respectively) for a quadrature encoder with no logic state width errors. The encoder can assume one of four possible states during the four equal, ideal intervals 101, 102, 103 and 104. The states are A high/B low during 101, A high/B high during interval 102, A low/B high during interval 103, and A low/B low during interval 104. Signal 110 transitions 110-1, 110-2 and 110-3 occur exactly between states. Likewise, signal 120 transitions 120-1 and 120-2 occur exactly between states. Signals 110 and 120 may be plotted against a channel phase progression 130, showing a 360 degree span for the time it takes a single channel to cycle from high to low and back to high. Additionally, quadrature phase progression 140 can be shown for comparison. Since the combination of two channels can assume one of four possible states, quadrature phase progression 140 is four times as fast as channel phase progression 130. As a result, the quadrature decoder cycles through 360 degrees of phase during the time that a single channel only cycles through 90 degrees of phase.

Figure 2:
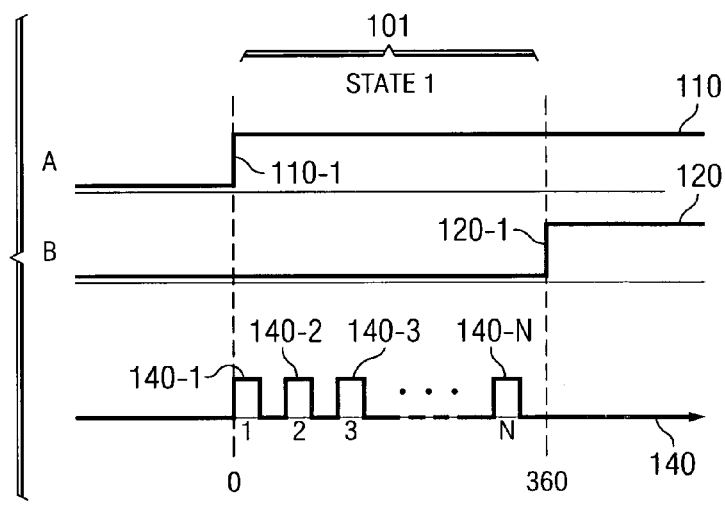
FIG. 2 shows the processing cycles of a quadrature encoder with ideal logic signals and no logic state width errors.

FIG. 2 shows the processing cycles (140-1 to 140-N) of a quadrature encoder with ideal logic signals 110 and 120 and no logic state width errors. Ideal signals 110 and 120 are plotted against quadrature phase progression 140. With no errors, State 1 exactly spans ideal interval 101. Transition 110-1 occurs exactly at the beginning of interval 101, and transition 120-1 occurs exactly at the end of interval 101. The decoder is set to cycle N times during interval 101, based on the desired safety factor. The first three cycles 140-1, 140-2 and 140-3 are shown along with cycle 140-N.

FIG. 3 shows non-ideal logic signals 310 and 320 for a quadrature encoder with a logic state width error. Signal 310 is from channel A and signal 320 is from channel B. For purposes of explanation, signal 310 transitions 310-1, 310-2 and 310-3 are shown to occur exactly between states. However, signal 320 transitions 320-1 and 320-2 may not occur exactly between states. As shown, transition 320-1 occurs during interval 101 rather than exactly at the end of interval 101, creating a logic state width error. Transition 320-1 breaks interval 101 (state 1) into error-free interval 301 and error interval 302. The combination of error-free interval 301 and error interval 302 spans the entirety of interval 101. Error interval 302 is represented as $E_1$ in channel phase progression 130 and $E_2$ in quadrature phase progression 140. Based on the relative rate of phase progressions 130 and 140, $E_2$ is four times $E_1$ when measured in units of degrees.

FIG. 4 shows processing cycles 140-1 to 140-N of a quadrature encoder with non-ideal logic signals 310 and 320 and a logic state width error of $E_2$, as plotted against quadrature phase progression 140. To meet the desired safety factor, all N cycles, 140-1, 140-2, 140-3 to 140-N must now occur during the shorter error-free interval 301 rather than taking full interval 101. To accommodate shorter interval 301, the processing speed (the number of clock pulses) must be increased.

In order for the error-free interval to contain N cycles, $$T_{cycle}[s]N = T_{error-free}[s] \quad (3)$$

Where:

$T_{cycle}$ is the processing time in seconds for one cycle $T_{error-free}$ is the error-free portion of the state interval in seconds $T_{cycle}$ may be calculated using the processing time for ideal signals and the measured error:

$$T_{cycle}[s] = (360 - E_2[\text{degrees}]/(360N)) T_{ideal}[s] \quad (4)$$

Where:

$T_{ideal}$ is the processing time in seconds for one logic state with ideal signals Once $T_{cycle}$ has been set, the safety factor SF can be verified using:

$$SF = T_{ideal}[s]/T_{cycle} \quad (5)$$

FIG. 5 shows a block diagram of measurement and reporting system 50 for one embodiment. System 50 comprises four functions: sample 51, compute 52, display 53 and control 54. Non-ideal logic signals 310 and 320 are sampled by sample function 51. Index signal 510 generates interrupts that allow system 50 to determine the duration of intervals between logic state changes as will be discussed with respect to FIG. 6. In embodiments of the invention, measurement and reporting system 50 may comprise digital signal processing (DSP) controller 55. Also, in embodiments of the invention, measurement and reporting system 50 may comprise software 56 programmed into a DSP controller to perform calculations and provide an interface. DSP controllers operating at 30 million instructions per second (MIPS), for example, provide a sufficient sampling speed to calculate timing error resolution of approximately one degree of phase or better with current generation quadrature encoders.

Figure 6:
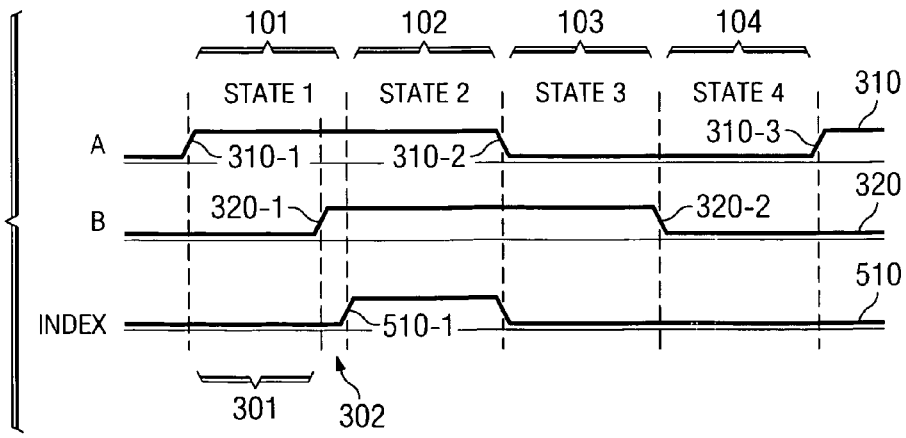
FIG. 6 shows non-ideal logic signals along with the index signal that generates interrupts for the controller measuring logic state width.

FIG. 6 shows non-ideal logic signals 310 and 320 along with index signal 510 that marks one full rotation of the encoder. In FIG. 6, transitions are shown as rising and falling edges with finite duration. Index signal 510 is used to trigger an interrupt in measurement and reporting system 50 (FIG. 5) for starting and stopping the time calculations, and includes transition 510-1. Transition 310-1 indicates that channel A has entering state 1. Transition 320-1 indicates that channel B has left state 1. Note that state 1 is broken into two subintervals 301 and 302. Error-free interval transition 301 is defined by transitions 310-1 and 320-1. Error interval 302 is defined by transitions 320-1 and 510-1.

For an ideal, error-free encoder, all logic states will have identical interval widths. However, error-free interval 301 is shorter than ideal state 1 interval 101 by the duration of interval 302. By calculating the duration of interval 301 relative to other intervals, measurement and reporting system 50 can then determine a logic state error width. That is, differences in the measured widths of logic states can be used to determine the logic state error width.

FIG. 7 shows procedure 700 for using an embodiment of the invention for alignment and verification. A user performs alignment process 701 and then verification process 702. Alignment process 701 has a number of steps: An encoder is installed 703; the encoder specifications are read 704 by measurement and reporting system 50 (FIG. 5); calculations are performed 705 by DSP controller 55 (FIG. 5) running software 56 (FIG. 5); measurement and reporting system 50 enables a user to read encoder performance parameters in real-time during alignment and adjustment of the encoder, which allows the user to optimize 706 encoder performance 706, and the encoder setup is locked 707. During verification process 702, measurement and reporting system 50 is used to verify and validate 708 that actual encoder performance meets a desired safety factor.

One embodiment of the invention comprises a measurement and reporting system 50 that can be used as discussed above. Measurement and reporting system 50 may comprise a hand-held unit with a user-readable display and a number of operational features. It can instantly calculate a maximum allowable state width error to assess the safety factor or calculate a safety factor using the state width error. It can provide real-time results for edge width separation, minimum logic state width, and errors in degrees. A resolution counter counts the number of codes per revolution for the quadrature output. Using the displayed information during installation and initial alignment and adjustment, a user may thus optimize encoder performance. For example, measurement and reporting system 50 may include a display that shows real-time error measurements that are read while the user is aligning the channels of an encoder. This enables a user to determine the direction of encoder adjustment that minimizes the measured error.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining a minimum required processing speed for a logic decoder comprising:
    measuring two or more logic state widths; and
    calculating said minimum required processing speed using said widths in combination with a desired number of processing cycles for deciding a logic state.

2. The method of claim 1 wherein said measuring comprises:
    capturing rising and falling edges of one or more logic signals; and
    determining a duration between said rising and falling edges.

3. The method of claim 2 further comprising:
    using index pulses to generate interrupts in a controller, wherein said interrupts start and stop time-keeping intervals.

4. The method of claim 1 wherein said using said widths comprises:
    determining an inequality between one of said widths and at least one other of said widths.

5. The method of claim 4 wherein said inequality is used to calculate a logic state width error.

6. The method of claim 1 wherein said logic decoder is a quadrature decoder.

7. A method for determining a safety factor of a logic decoder, said decoder having a processing speed, said method comprising:
    measuring two or more logic state widths;
    calculating a logic state width error;
    choosing a number of processing cycles required to decide a logic state; and
    calculating said safety factor using said logic state width error, said decoder processing speed and said chosen number of processing cycles.

8. The method of claim 7 wherein said measuring comprises:
    capturing rising and falling edges of one or more logic signals; and
    determining a duration between said rising and falling edges.

9. The method of claim 8 further comprising:
    using index pulses to generate interrupts in a controller, wherein said interrupts start and stop time-keeping intervals.

10. The method of claim 7 wherein said calculating a logic state width error comprises:
    determining an inequality between one of said widths and at least one other of said widths.

11. The method of claim 7 wherein said logic decoder is a quadrature decoder.

12. A system for analyzing logic encoder performance comprising:
    a sampler, for capturing rising and falling edges of logic signals on channels of said encoder;
    logic for determining two or more logic state widths using the said rising and falling edges and determining inequalities between one of said widths and at least one other of said widths;
    logic to calculate logic state width error using said inequalities, and
    logic to calculate a required decoder processing speed using said logic state width error in combination with a desired number of processing cycles for deciding a logic state.

13. A system for analyzing logic encoder performance comprising:
    a sampler, for capturing rising and falling edges of logic signals on channels of said encoder;
    logic for determining two or more logic state widths using the said rising and falling edges and determining inequalities between one of said widths and at least one other of said widths;
    logic to calculate logic state width error using said inequalities, and
    logic to calculate a decoder safety factor using said logic state width error in combination with a processing speed of said decoder.

14. The system of claim 12 or 13, further comprising:

a controller for controlling said sampler; wherein said controlling comprises starting and stopping sampling intervals.

15. The system of claim 12 or 13, further comprising:

logic to calculate logic state width error using said inequalities.

16. The system of claim 12 or 13, further comprising:

a user interface.

17. The system of claim 16 wherein said user interface comprises:

a display, wherein said display shows said logic state width error.

18. The system of claim 12 or 13, further comprising:

a resolution counter, said counter counting a number of codes per revolution.

19. The system of claim 12 or 13, wherein said sampler detects index pulses of said logic encoder.

* * * * *

UNITED STATES PATENT AND TRADEMARK OFFICE
CERTIFICATE OF CORRECTION

| | |
|---|---|
| PATENT NO. | : 7,461,317 B2 |
| APPLICATION NO. | : 11/300922 |
| DATED | : December 2, 2008 |
| INVENTOR(S) | : Moon Leong Low et al. |

Page 1 of 1

It is certified that error appears in the above-identified patent and that said Letters Patent is hereby corrected as shown below:

Column 8, Line 1, Claim 17, delete "claim 16" and insert -- claim 16, --.

Signed and Sealed this

Ninth Day of November, 2010

David J. Kappos
*Director of the United States Patent and Trademark Office*